(12) United States Patent
Cantwell

(10) Patent No.: US 8,313,546 B2
(45) Date of Patent: Nov. 20, 2012

(54) FLUID FLOW FILTER

(76) Inventor: Jay S. Cantwell, St. Charles, MO (US)

( * ) Notice: Subject to any disclaimer, the term of this patent is extended or adjusted under 35 U.S.C. 154(b) by 274 days.

(21) Appl. No.: 10/922,168

(22) Filed: Aug. 20, 2004

(65) Prior Publication Data
US 2006/0037472 A1 Feb. 23, 2006

(51) Int. Cl.
B01D 53/02 (2006.01)
(52) U.S. Cl. .................. 55/385.6; 96/4; 96/131; 96/132
(58) Field of Classification Search .............. 55/318, 55/385.6; 95/45, 90; 96/4, 121, 131, 132, 96/134, 135; 360/97.02, 97.03
See application file for complete search history.

(56) References Cited

U.S. PATENT DOCUMENTS

| | | | | |
|---|---|---|---|---|
| 1,789,194 A | * | 1/1931 | Rockwell | 423/236 |
| 2,676,668 A | * | 4/1954 | Lindsay | 96/131 |
| 4,478,619 A | * | 10/1984 | Arends et al. | 96/132 |
| 4,684,510 A | * | 8/1987 | Harkins | 423/210 |
| 5,447,695 A | * | 9/1995 | Brown et al. | 422/171 |
| 5,538,543 A | * | 7/1996 | Watanabe et al. | 96/131 |
| 5,595,910 A | * | 1/1997 | Kant et al. | 435/289.1 |
| 5,764,435 A | * | 6/1998 | Sugimoto et al. | 360/97.02 |
| 6,086,659 A | * | 7/2000 | Tentarelli | 96/131 |
| 6,214,070 B1 | * | 4/2001 | Crowder et al. | 55/320 |
| 6,475,269 B1 | * | 11/2002 | Turner | 96/134 |
| 6,475,270 B1 | * | 11/2002 | Graeve | 96/135 |
| 6,824,595 B2 | * | 11/2004 | Ueki et al. | 96/134 |
| RE38,844 E | * | 10/2005 | Hiltzik et al. | 95/146 |
| 2001/0015134 A1 | * | 8/2001 | Uchino et al. | 96/130 |
| 2004/0055468 A1 | * | 3/2004 | Makino et al. | 96/131 |

* cited by examiner

Primary Examiner — Frank M. Lawrence

(57) ABSTRACT

A fluid filter for preventing the introduction of fluid contaminants into an associated device is disclosed. The filter has a housing having an inlet chamber and an outlet chamber. The inlet chamber forms an inlet port of the fluid filter and the outlet chamber forms an outlet port of the fluid filter. A number of serially connected intermediate chambers are coupled between the inlet chamber and the outlet chamber. Each of the chambers contains an absorbent material for capturing the fluid contaminants and generally preventing their introduction into the associated device.

17 Claims, 4 Drawing Sheets

FLUID FLOW FILTER

BACKGROUND OF THE INVENTION

The present invention generally relates to the field of climate control and more particularly, is directed to a fluid flow filter which traps and prevents contaminants from reaching environmentally sensitive areas of an electronic device.

Many electronic devices require that the climate in which they operate be maintained within a certain range. Typically, environmental factors such as temperature, temperature stability, humidity and air quality are of paramount concern with respect to the operating life of the equipment and its mean time between failures (MTBF).

Continued exposure to elevated temperatures is one of the primary causes of premature failure in well-designed electronic equipment. Most equipment produces heat as an unwanted by-product. Thus, means must be provided to dissipate a certain amount of the heat so that the device can safely operate within its designed environmental specification.

A common and well accepted method of dissipating heat is to use some form of heat exchange device. Such a device can be as simple as a metal heat fin attached to the heat generating device and is often referred to as a heat sink. Other methods of dissipating heat rely on forced air cooling where air is blown or pulled over the heat generating device in order to absorb and carry away as much heat as possible.

Forced air cooling subjects the device to contaminants brought in by the air from the environment outside of the device. These contaminants can include foreign objects such as dust particles and water vapor. Absent some form of filtering or trapping of these contaminants to prevent their introduction into the device, the operating life of the device may well be adversely effected.

Accordingly, there is known in the art a number of techniques for filtering air before its introduction into a device for the purpose of controlling environmental factors such as temperature and humidity. (For purpose of this specification, the words "air" and "fluid" are used interchangeably.) Techniques known in the art generally are deficient for a number of reasons. These deficiencies include over restriction of air flow in order to insure adequate filtration, providing sufficient air flow at the expense of efficient filtration, complicated design and high cost.

One example of environment control and air flow filtration that is commonly needed in an electronic device is that of a hard disk drive. A hard drive is used in a computer system to store data. As the need for storage capacity has increased over the years, so to has the complexity of hard drives and their sensitivity to the internal environment in which they operate.

Data in a hard disk drive is stored on a magnetic platter. The drive operates by a read/write head hovering a few micros above the rotating platter. Characteristics which determine the storage capacity of the drive and the speed at which data can be written to and read from the drive include the rotating speed of the media and the proximity of the read/write head to the surface of the platter.

As data packing density increases in order to keep pace with the need for more storage capacity, the sensitivity of the magnetic platter to elevated temperatures, temperature variations and the presence of contaminates increase as well. In addition, the presence of contaminants raises the likelihood that a stray particle will become lodged between the read/write head and the platter, thus causing data read/write errors and possible destruction of the hard drive.

Failure to take adequate safeguards to prevent temperature extremes and the introduction of contaminates takes on added significance in high capacity hard disk drives. In high capacity drives, the magnetic platter rotates at a higher speed and the distance between the data read/write heads and the surface of the platter is smaller. Thus, the platters in modern high capacity drives are more sensitive to warping caused by uncontrolled temperature variations and stray contaminates than their lower capacity counterparts.

Thus, there is a need in the art for an air flow filter for preventing the inadvertent introduction of contaminates into the drive. Such filters, however, are deficient for a number or reasons as pointed out above.

SUMMARY OF THE INVENTION

It is therefore the overall objective of the present invention to provide an air flow filter which efficiently protects electronic devices from the inadvertent introduction of contaminates into the device.

It is a specific objective of the present invention to provide an air flow filter which is simple in construction and can be easily integrated into conventional electronic devices.

It is another specific objective of the present invention to provide an air flow filter which can be manufactured using a number of conventional manufacturing techniques.

It is a still further specific objective of the present invention to provide an air flow filter which can be manufactured in large quantities with consistent performance specifications.

It is another specific objective of the present invention to provide an air flow filter which can be used in a computer hard disk drive to prevent the inadvertent introduction of contaminants into the drive.

It is a still further specific objective of the present invention to provide an air flow filter for use in a computer hard disk drive which can be directly mounted into the drive.

It another specific objective of the present invention to provide an air flow filter which can be used to prevent the introduction of contaminants into the hard disk drive bay area of a computer.

Existing hard drive air flow filters use an expensive molded carbon filter on a less clean less dense carbon impregnated sheet for fluid filtration and migration. Other prior art filters use carbon beads. As the air flow passes around the beads, the beads tend to create noise and carbon dusk within the filter housing. The present invention provides a means to eliminate the noise and dust so that less expensive carbon beads can be used. The scope of this design is to provide an alternate means to control the transfer rates and dispersion uniformity into the carbon beads.

Current filters also use an integral fluid and air dispersion path molded into the housing which controls the fluid and air transfer rates from in and out of the disk drive whether or not the drive is in use.

It is also an objective of the present invention to improve upon the use of the final PTFE filter that is common after the carbon filter material. This is placed just prior to the drive internal housing for final particle filtration. Existing methods expose the internal drive cavity to loose edge fibers potentially present on the cut edge of the membrane. The method of the present invention eliminates potential edge fiber contamination.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

Figure 1:
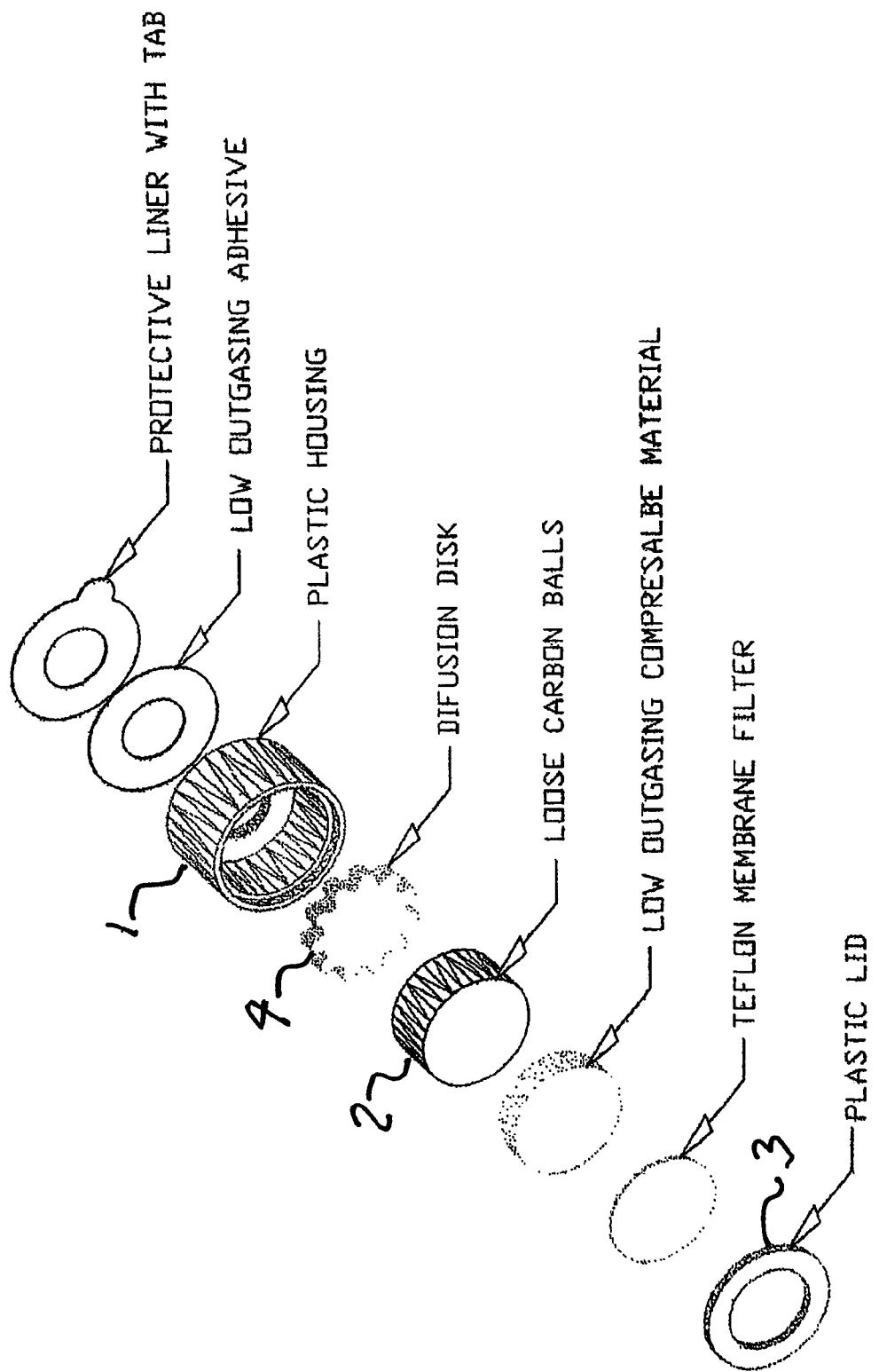
FIG. 1 is an assembly view of one embodiment of an air flow filter in accordance with the present invention.

One embodiment of the present invention uses a two-piece injection molded plastic housing as illustrated in FIG. 1. The house is formed of a canister 1 which is filled with material 2 and a lid 3 that fits into the canister 1 and holds the material under compression in the canister and tightly within the housing.

A non-integral permeable compression material or compression disk is press fit tight into the bottom and to the inside face of the canister as to keep it from moving after installation. The semi-permeable compression disk 4 has a perimeter cut that provides both contact and non-contact areas against the inside wall of canister 1 over the thickness of the compression disk. This allows for the fluid and air to pass through the face and the edge of the compression disk as it enters or exits the disk via a center hold in the bottom face of the canister. Any number of patterns could be generated around the perimeter of the compression disk. The thickness and density of the compression material can also be changed to affect the amount of compression force on the beads.

With the bottom hole in the canister plugged with the compression disk, the canister can be filled with carbon beads to the desired amount and is typically done by weight. The second permeable compression material or compression disk is then placed on top of the carbon filter material. Both the permeable compression disks are thick enough that it will be under compression after final assembly of the lid unit on top of it. The thickness of the compression disk is therefore partially in the canister and partially outside prior to final assembly. This will put both the carbon beads under compression pressing these materials pressed tightly against the canister bottom face and side wall. The carbon beads can't move to create noise or dust and thy can't get past the compression disk out the entry hole. Again, the thickness and density of the compression disk can be altered to achieve desired preload on the filter media.

The lid-filter unit is pre assembled and tested prior to final assembly to the canister. The assembly consist of two details, a disk like part with a center cut out of a tuned size and shape, and a smaller diameter membrane PTFE filter that is centered and then attached to the inside face of the lid around the membrane perimeter. This is typically done ultrasonically but may be done with other methods. The lid-filter unit is now attached to the canister with the filter toward the inside while compressing the compression disks. Ultrasonic welding or adhesive can be used to attach the lid for a total seal. The loose membrane edge fibers are now contained within the housing and can't migrate into the drive cavity.

The filter assembly is attached to the inside surface of a disk drive hosing using pressure sensitive adhesive while aligning entry holes in the devices.

Figure 2:
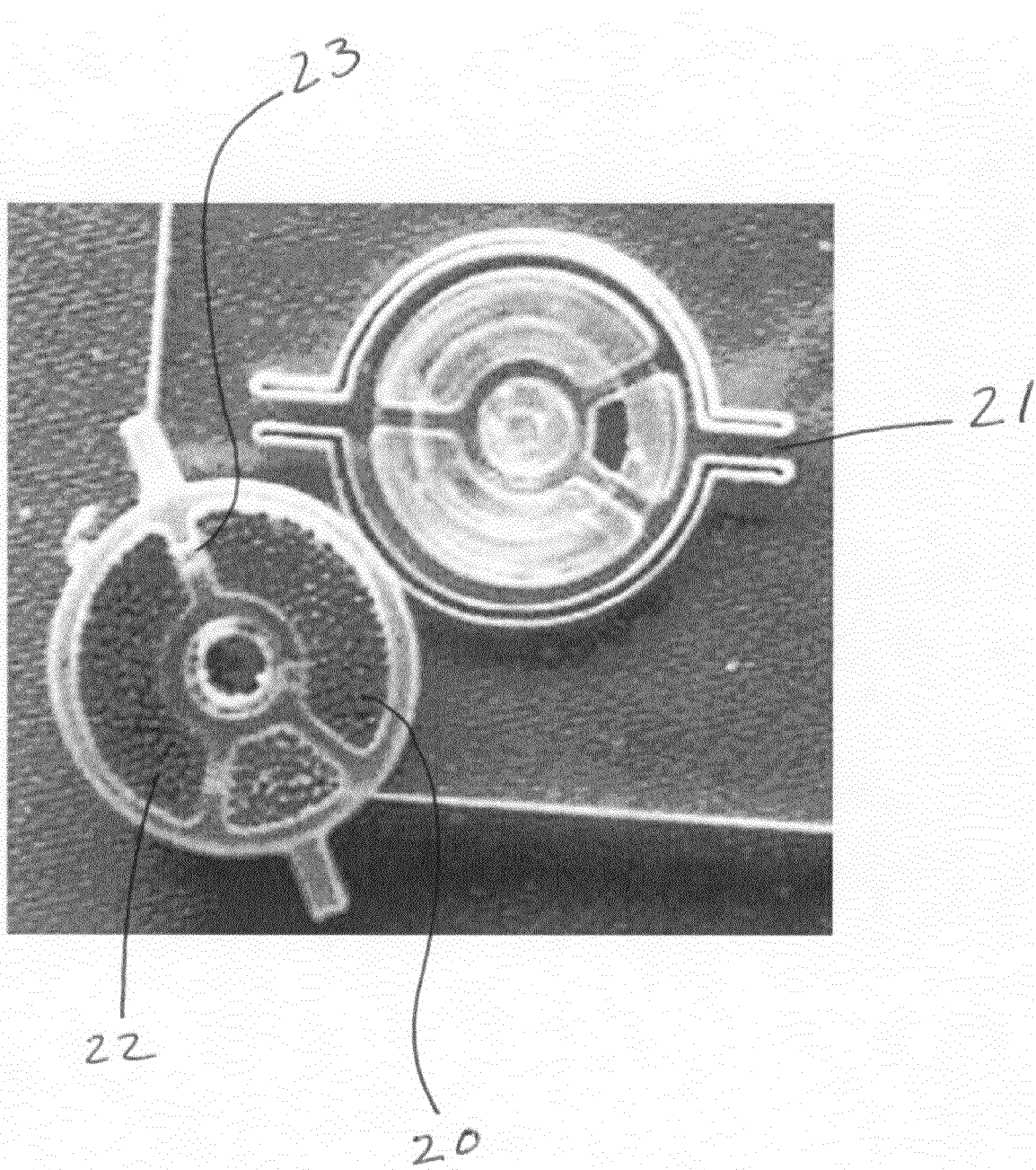
FIG. 2 is a top and bottom view of another embodiment of the air flow filter in accordance with the present invention.
Figure 3:
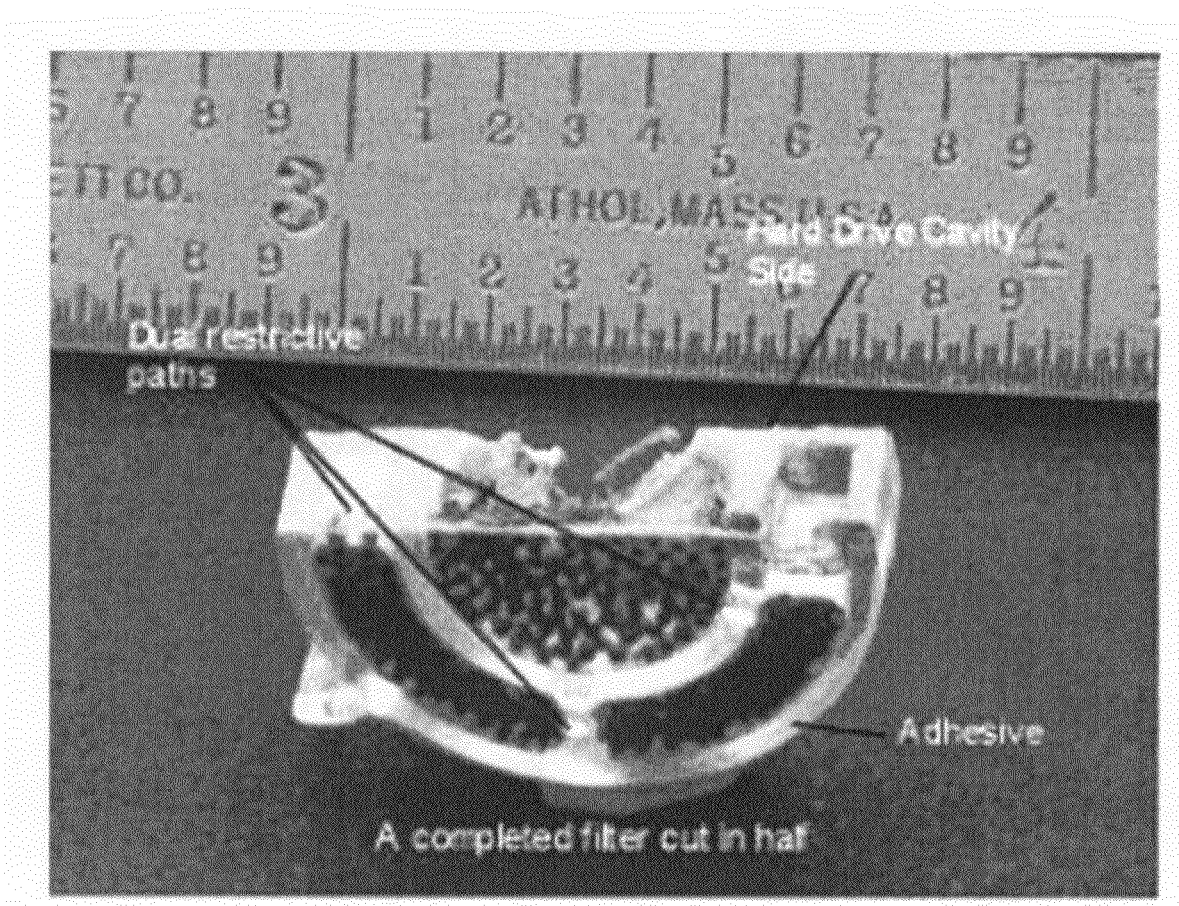
FIGS. 3-4 are cross-sectional views of the air flow filter illustrated in FIG. 2.
Figure 4:
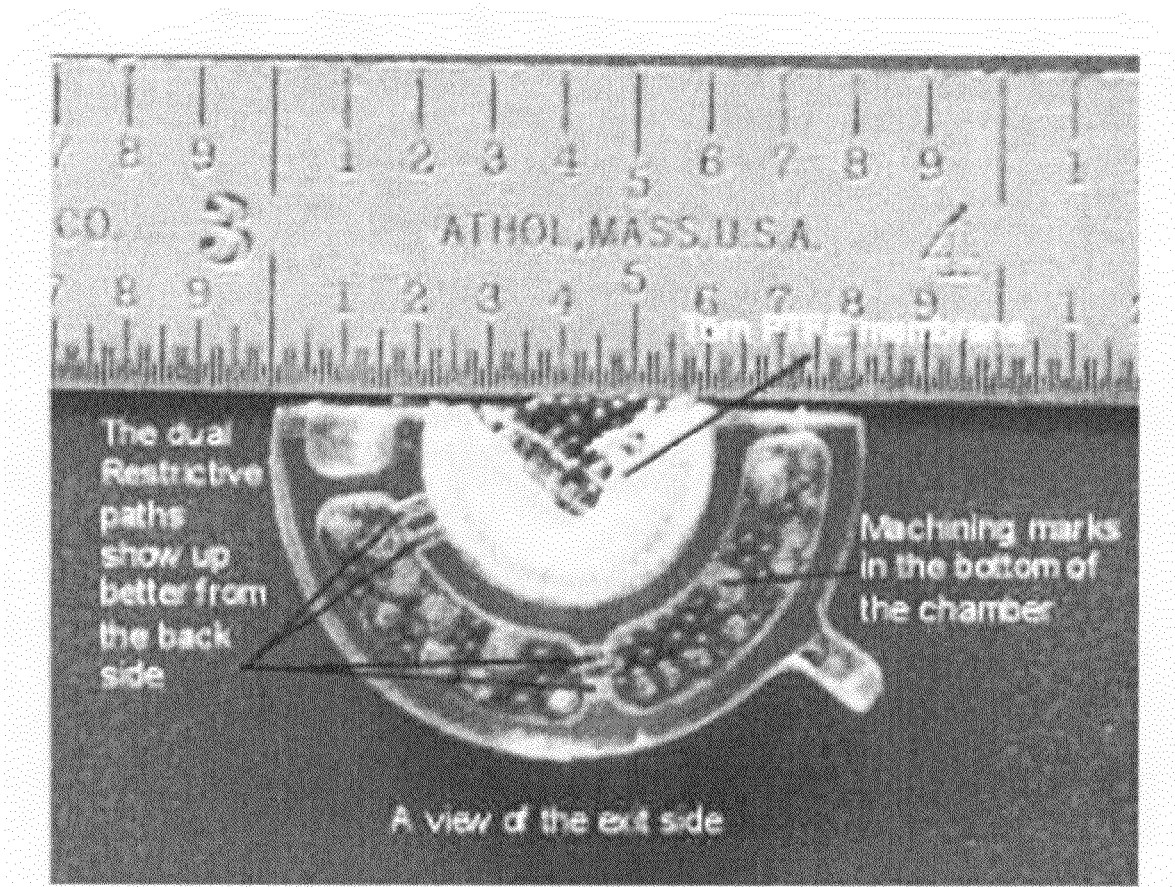

A further embodiment of the present invention is illustrated in FIGS. 2-4.

As shown in FIG. 2, the filter of this embodiment is of a molded designed which has a plurality of filter chambers 20 and an exit chamber 21. Each of the chambers is filled with carbon beads 22 and each chamber is separated by dual restrictive paths 23. FIGS. 3 and 4 are cross-sectional views of the filter design of this embodiment and further illustrated the filter chambers 20 and dual restrictive paths 23.

Applicants have found that air flow through the relatively large chamber 20 and then through the associated restrictive paths 23 substantially increases the effectiveness and efficiency of the filter. This simplified design also is very easy to manufactures using conventional molding processes.

High efficiency of this embodiment of the present invention is achieved by using carbon filled paths (chambers 22) with multiple directional changes. The paths can consist of various sizes of expansion chamber then restriction, expansion chamber then restriction etc, all filled with filter media, to progressively reduce the flow and absorb contaminates.

Flow through the expansion chambers can be across the top of each chamber or enter the top and leave the bottom of each chamber. Applicant has found that each approach is effective.

The expansion chambers can also vary in size and can alternately be filled with different filter media. The size of each chamber can increase or decrease from the origin to accelerate or decrease fluid transfer rates.

The present embodiment may also be modular (stackable) in construction. Each filter may be charged with different filter media and have different restrictive and chamber sizes in order to tune performance.

Multiple expansion chambers and restrictions minimize laminar flow, reduce velocity, and create reversal of the direction of flow, thus increasing filter media efficiency and controlling the transfer rate of contaminates.

Potential edge fiber from the incoming and outgoing encapsulating membrane medias is completely contained within the filter housing assembly in the present embodiment.

A feature, shape or bonding media is present to facilitate the internal sealing of the encapsulating membrane media, either incoming and/or outgoing, which could also serve to increase surface area of the incoming and/or outgoing encapsulating medias.

The present embodiment facilitates the pre-testing and approval of the encapsulating membrane on the internal surface of the lid to reduce manufacturing rejects. The construction provides for increased efficiently, thus allowing the reduction of overall size to accommodate controlled filtration and the ever reducing size requirements of controlled transfer filtration.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

I claim:

1. A fluid filter for preventing the introduction of fluid contaminants into an associated device when fluid passes into said device, said fluid filter comprising:

a housing having an inlet chamber and an outlet chamber;

said inlet chamber forming an inlet port of said fluid filter and said outlet chamber forming an outlet port of said fluid filter;

a plurality of serially connected intermediate chambers coupled between said inlet chamber and said outlet chamber;

each of said intermediate chambers containing an absorbent material for capturing said fluid contaminants and generally preventing their introduction into said associated device; and an incoming and out going membrane media fully contained within said fluid filter to keep loose edge fibers from entering said intermediate chambers.

2. A fluid filter according to claim 1, wherein some of said intermediate chambers having a first chamber size and others of said intermediate chambers having a second chamber size.

3. A fluid filter according to claim 2, wherein some of said intermediate chambers are positioned to cause a change in flow direction of said fluid passing through said intermediate chambers.

4. A fluid filter according to claim 3, wherein adjacent ones of said intermediate chambers are of a different size.

5. A fluid filter according to claim 4, wherein each of said intermediate chambers have an inlet and an outlet, said inlets in some of said intermediate chambers being on a different plane than their associated outlet.

6. A fluid filter according to claim 5, wherein some of said intermediate chambers are filled with a first filter material and others of said intermediate chambers are filled with a second filter material.

7. A stackable fluid filter for preventing the introduction of fluid contaminants into an associated device when fluid passes into said device, said fluid filter comprising:

a housing having a fluid inlet and a fluid outlet, said housing being adapted for stacking of a plurality of said housing;

a filter chamber coupled between said inlet and said outlet;

an absorbent material within said filter chamber for capturing said fluid contaminants and generally preventing their introduction into said associated device; and an incoming and out going membrane media fully contained within said fluid filter to keep loose edge fibers from entering said chamber.

8. A stackable fluid filter according to claim 7, wherein the size of said filter chamber is selected from a plurality of chamber sizes.

9. A stackable fluid filter according to claim 8, wherein the fluid flow direction of said filter chamber is selected from a plurality of fluid flow directions.

10. A stackable fluid fluid filter according to claim 9, wherein said filter chamber has an inlet and an outlet, said inlet being on a different plane than said outlet.

11. A stackable fluid filter according to claim 5, wherein said filter chamber is filled with a filter material selected from a plurality of filter materials.

12. A method of preventing the introduction of fluid contaminants into an associated device when fluid passes into said device, said method comprising the steps:

providing a housing having an inlet chamber and an outlet chamber;

forming within said inlet chamber an inlet port for said fluid and forming within said outlet chamber an outlet port for said fluid;

providing a plurality of serially connected intermediate chambers coupled between said inlet chamber and said outlet chamber;

providing within each of said intermediate chambers an absorbent material for capturing said fluid contaminants and generally preventing their introduction into said associated device; and providing incoming and out going membrane media fully contained within said housing to keep loose edge fibers from entering said intermediate chambers.

13. The method of claim 12, further including the step of providing some of said intermediate chambers with a first chamber size and others of said intermediate chambers with a second chamber size.

14. The method of claim 13, further including the step of positioning some of said intermediate chambers to cause to change in flow direction of said fluid passing through said intermediate chambers.

15. The method of claim 14, further including the step of providing adjacent ones of said intermediate chambers in different sizes.

16. The method of claim 15, further including the step of providing said inlets in some said intermediate chambers in a different plane than their associated outlet.

17. The method of claim 16, further including the step of filling some of said intermediate chambers with a first filter material and others of said intermediate chambers with a second filter material.

* * * * *